(12) United States Patent
Gannon et al.

(10) Patent No.: US 12,140,139 B2
(45) Date of Patent: Nov. 12, 2024

(54) GRAVITY FLOW FILTRATION OF HYDROCARBONS FROM AN OIL-IN-WATER EMULSION

(71) Applicant: Solidification Products International, Inc., Northford, CT (US)

(72) Inventors: William J. Gannon, Northford, CT (US); David Tomlinson, Cheshire, CT (US); Paul Melaccio, Clinton, CT (US)

(73) Assignee: SOLIDIFICATION PRODUCTS INTERNATIONAL, INC., Northford, CT (US)

( * ) Notice: Subject to any disclaimer, the term of this patent is extended or adjusted under 35 U.S.C. 154(b) by 0 days.

(21) Appl. No.: 17/687,930

(22) Filed: Mar. 7, 2022

(65) Prior Publication Data

US 2022/0196012 A1 Jun. 23, 2022

Related U.S. Application Data

(63) Continuation-in-part of application No. 17/490,781, filed on Sep. 30, 2021.

(Continued)

(51) Int. Cl.
*F04B 53/20* (2006.01)
*B01D 17/04* (2006.01)
(Continued)

(52) U.S. Cl.
CPC ............ *F04B 53/20* (2013.01); *B01D 17/047* (2013.01); *B01D 39/1623* (2013.01);
(Continued)

(58) Field of Classification Search
CPC ...... B01D 17/045; B01D 17/04; B01D 17/02; B01D 17/0202; B01D 17/047;
(Continued)

(56) References Cited

U.S. PATENT DOCUMENTS 1,756,862 A * 4/1930 Holford ............. B01D 17/0208
210/537
2,701,529 A * 2/1955 Finzel ................... F04D 13/086
417/423.3
(Continued)

FOREIGN PATENT DOCUMENTS

EP 849040 A2 * 6/1998 ............. B01D 39/16

OTHER PUBLICATIONS

Synthetic Ester Transformer Fluids; Electrical & Power Review Magazine; Feb. 10, 2019; 1 page (Year: 2019) (Year: 2019).*

(Continued)

*Primary Examiner* — Robert J Popovics
(74) *Attorney, Agent, or Firm* — DeLio Peterson & Curcio LLC; Robert Curcio

(57) ABSTRACT

A polishing filter employed within a sump pump system for removing mineral oils, natural ester, and synthetic ester-based fluids from an emulsion is provided. The polishing filter is disposed within a sump pump barrier and is gravity-fed a synthetic ester and water based emulsion via a polishing filter conduit. The polishing filter removes excess synthetic ester-based fluids from a water/oil emulsion fluid flowing through a barrier canister disposed within the sump pump barrier above the polishing filter and releases a resultant filtered fluid. The polishing filter cartridge contains a filtration media with a hydrophilic composition for the capture of synthetic ester-based fluid having a surface tension dissimilar to water, and the hydrophilic composition of the media has a surface energy greater than or equal to 35 dynes per centimeter.

9 Claims, 10 Drawing Sheets

Related U.S. Application Data

(60) Provisional application No. 63/085,673, filed on Sep. 30, 2020.

(51) Int. Cl.
  *B01D 39/16* (2006.01)
  *B01D 39/20* (2006.01)
  *F04B 15/02* (2006.01)

(52) U.S. Cl.
  CPC .......... *B01D 39/2017* (2013.01); *F04B 15/02* (2013.01); *B01D 2239/0421* (2013.01); *B01D 2239/1208* (2013.01); *B01D 2239/1291* (2013.01)

(58) Field of Classification Search
  CPC ........ B01D 2239/0421; B01D 2239/04; B01D 2239/1208; B01D 2239/1291; B01D 39/1623; B01D 39/14; B01D 39/2117; B01D 63/06; B01D 2311/26; B01D 2311/2626; B01D 2311/2649; B01D 2313/20; B01D 2313/203; B01D 61/04; B01D 61/10; B01D 61/16; B01D 61/18; B01D 61/20; B01D 17/10; C02F 1/28; C02F 1/40; C02F 2101/32; C02F 2103/001; C02F 2201/005; C02F 2201/006; F04B 2201/00; F04B 15/02; F04B 53/20
  See application file for complete search history.

(56) References Cited

U.S. PATENT DOCUMENTS

| | | | | |
|---|---|---|---|---|
| 3,016,345 A * | 1/1962 | Price | ................. | B01D 17/045 134/13 |
| 3,112,760 A * | 12/1963 | Budd | ................. | E03F 5/22 137/565.33 |
| 3,461,803 A * | 8/1969 | Johnson | ............ | F04D 15/0218 137/554 |
| 3,558,018 A * | 1/1971 | Hudig | ................. | F04D 29/406 417/86 |
| 3,645,398 A * | 2/1972 | Fiocco | ................ | B01D 17/045 210/DIG. 5 |
| 3,651,944 A * | 3/1972 | Shuttleworth | ..... | B01D 17/0211 210/406 |
| 3,667,692 A * | 6/1972 | Grace | ................ | B02C 18/0092 241/258 |
| 3,726,606 A * | 4/1973 | Peters | ................. | F04D 13/068 417/40 |
| 3,733,449 A * | 5/1973 | Parker | ................ | F04B 23/025 200/81 R |
| 3,797,666 A * | 3/1974 | Nakanishi | ........... | B01D 17/12 210/DIG. 5 |
| RE28,104 E * | 8/1974 | Grace | ................ | B02C 18/0092 241/258 |
| 3,844,743 A * | 10/1974 | Jones | ................ | B01D 17/0202 210/DIG. 5 |
| 3,847,821 A * | 11/1974 | Krueger | ............. | B01D 17/045 210/488 |
| 3,852,193 A * | 12/1974 | Jakubek | ............. | B01D 17/08 210/744 |
| 3,862,963 A * | 1/1975 | Hoshi | ................ | B01J 20/26 524/451 |
| 3,865,732 A * | 2/1975 | Terhune | ............ | G01N 33/1833 210/DIG. 5 |
| 3,876,544 A | 4/1975 | Fowler | | |
| 3,925,202 A * | 12/1975 | Hirs | ................. | B01D 24/4631 210/275 |
| 3,941,507 A * | 3/1976 | Niedermeyer | ........ | F04D 13/068 417/40 |
| 3,951,814 A * | 4/1976 | Krueger | ............ | B01D 17/045 210/488 |
| 3,957,647 A * | 5/1976 | Jones | ................. | B01D 17/045 588/900 |
| 4,011,159 A * | 3/1977 | Stein | ................. | C02F 1/681 134/4 |
| 4,022,694 A * | 5/1977 | Fruman | ............. | B01D 17/0202 210/350 |
| 4,039,489 A * | 8/1977 | Fletcher | ............ | C08G 18/6677 521/131 |
| 4,057,366 A * | 11/1977 | Niemann | ............ | F04D 29/605 417/234 |
| 4,058,463 A | 11/1977 | Bartik | | |
| 4,061,573 A * | 12/1977 | Biron | ................ | B01D 17/08 210/924 |
| 4,111,813 A * | 9/1978 | Preus | ................ | E02B 15/06 210/924 |
| 4,139,463 A * | 2/1979 | Murphy | ............. | B01D 17/02 210/DIG. 5 |
| 4,162,973 A * | 7/1979 | Lynch | ................ | B01D 17/12 210/776 |
| 4,172,031 A * | 10/1979 | Hall | ................. | B01D 17/0202 210/691 |
| 4,213,863 A * | 7/1980 | Anderson | ........... | B01D 17/045 210/DIG. 5 |
| 4,226,722 A * | 10/1980 | Jones | ................ | B01D 17/045 210/708 |
| 4,228,427 A * | 10/1980 | Niedermeyer | ........ | F04D 13/068 417/63 |
| 4,309,157 A * | 1/1982 | Niedermeyer | ........ | F04D 13/068 417/421 |
| 4,356,090 A * | 10/1982 | Tran | ................. | B01D 17/0202 210/DIG. 5 |
| 4,366,846 A * | 1/1983 | Curati, Jr. | ........... | E01B 19/006 405/36 |
| 4,405,446 A * | 9/1983 | Kruyer | ............. | C10G 1/047 210/DIG. 5 |
| 4,406,793 A * | 9/1983 | Kruyer | ............. | C10G 33/00 210/DIG. 5 |
| 4,497,712 A * | 2/1985 | Cowling | ............. | E02B 15/101 210/691 |
| 4,592,846 A * | 6/1986 | Metzger | ............. | E02D 31/00 405/129.57 |
| 4,655,927 A | 4/1987 | Ford | | |
| 4,709,723 A * | 12/1987 | Sidaway | ............ | E03F 11/00 137/592 |
| 4,740,311 A * | 4/1988 | Kruyer | ............. | B01D 17/0214 210/799 |
| 4,744,889 A * | 5/1988 | Kruyer | ............. | B03B 9/02 210/671 |
| 4,765,775 A * | 8/1988 | Kroger | ............. | B65D 90/24 52/102 |
| 4,775,473 A * | 10/1988 | Johnson | ............ | C09K 3/32 210/502.1 |
| 4,862,909 A * | 9/1989 | Kim, II | .............. | F04B 43/08 220/571 |
| 4,870,151 A * | 9/1989 | Scholl | ............... | C10G 33/04 560/115 |
| 5,099,872 A * | 3/1992 | Tarvin | ............. | F16N 31/002 296/38 |
| 5,180,704 A * | 1/1993 | Reindl | .............. | C02F 1/681 264/109 |
| 5,196,117 A * | 3/1993 | Billiett | ............... | B01D 17/045 210/260 |
| 5,229,015 A * | 7/1993 | Keep | ................. | B01D 17/0208 210/287 |
| 5,239,007 A * | 8/1993 | Le-Khac | ............ | C08F 291/02 525/305 |
| 5,239,040 A * | 8/1993 | Kozlowski | ........... | C08G 18/02 521/122 |
| 5,242,604 A * | 9/1993 | Young | ................ | B01D 17/00 210/DIG. 5 |
| 5,244,569 A * | 9/1993 | Di Amico | .......... | B01D 17/0208 210/171 |
| 5,249,930 A * | 10/1993 | Pacquesi | ............ | F04D 13/086 417/313 |
| 5,266,208 A * | 11/1993 | Stahly | ............... | C02F 1/281 210/195.1 |

(56) References Cited

U.S. PATENT DOCUMENTS

| | | | | |
|---|---|---|---|---|
| 5,297,367 A * | 3/1994 | Sainz | E03F 5/16 | 52/12 |
| 5,305,779 A * | 4/1994 | Izaguirre | G05D 9/12 | 137/392 |
| 5,324,429 A * | 6/1994 | Holland | E02B 15/10 | 210/489 |
| 5,325,897 A * | 7/1994 | Richardson | G01N 1/2035 | 141/97 |
| 5,326,469 A * | 7/1994 | Thompson | B01D 17/02 | 210/197 |
| 5,328,598 A * | 7/1994 | Lohrl | B01D 17/08 | 210/194 |
| 5,331,079 A * | 7/1994 | Kozlowski | C08G 18/02 | 528/48 |
| 5,364,535 A * | 11/1994 | Buckalew | E03F 5/16 | 210/671 |
| 5,374,600 A * | 12/1994 | Hozumi | B01J 20/26 | 502/402 |
| 5,391,295 A * | 2/1995 | Wilcox | E03F 5/04 | 210/283 |
| 5,403,491 A * | 4/1995 | Holland | E21B 43/38 | 210/680 |
| 5,439,180 A * | 8/1995 | Baughman | F04D 15/0218 | 241/46.06 |
| 5,449,274 A * | 9/1995 | Kochan, Jr. | F04D 15/0218 | 417/41 |
| 5,458,773 A * | 10/1995 | Holland | C02F 1/681 | 428/36.1 |
| 5,462,655 A * | 10/1995 | Ladd | C02F 1/441 | 210/257.2 |
| 5,462,785 A * | 10/1995 | Holland | E02B 15/101 | 428/72 |
| 5,466,367 A * | 11/1995 | Coate | C02F 3/10 | 210/295 |
| 5,484,522 A * | 1/1996 | Entrekin | B01D 17/0214 | 210/114 |
| 5,507,944 A * | 4/1996 | Friedland | E03F 5/14 | 210/162 |
| 5,511,904 A * | 4/1996 | Van Egmond | E03F 1/002 | 405/36 |
| 5,514,266 A * | 5/1996 | O'Brien | B01D 17/0217 | 210/252 |
| 5,518,797 A * | 5/1996 | Holland | C09K 3/32 | 428/36.1 |
| 5,527,457 A * | 6/1996 | Holland | E21B 43/38 | 210/170.07 |
| 5,547,313 A * | 8/1996 | Holland | E02B 15/06 | 405/63 |
| 5,562,254 A * | 10/1996 | Sleasman | E03F 5/26 | 241/DIG. 38 |
| 5,565,094 A * | 10/1996 | Zoch | B01D 17/045 | 210/167.04 |
| 5,566,731 A * | 10/1996 | Holland | B63B 17/0036 | 220/571 |
| 5,569,372 A * | 10/1996 | Smith | E03F 1/00 | 210/85 |
| 5,588,785 A * | 12/1996 | Holland | E02B 15/101 | 428/72 |
| 5,645,004 A * | 7/1997 | Holland | C02F 1/681 | 114/211 |
| 5,645,378 A * | 7/1997 | Holland | E02B 15/101 | 428/72 |
| 5,647,977 A * | 7/1997 | Arnaud | C02F 9/00 | 210/207 |
| 5,662,801 A * | 9/1997 | Holland | C02F 1/288 | 210/799 |
| 5,679,246 A * | 10/1997 | Wilcox | E03F 7/02 | 210/170.03 |
| 5,679,257 A * | 10/1997 | Coate | C02F 9/00 | 210/764 |
| 5,707,527 A * | 1/1998 | Knutson | C02F 1/283 | 210/170.03 |
| 5,730,558 A * | 3/1998 | Holland | C02F 1/681 | 428/72 |
| 5,804,081 A * | 9/1998 | DeGesero | B01D 17/0211 | 210/170.03 |
| 5,816,510 A * | 10/1998 | Earle, III | E03F 5/26 | 241/DIG. 38 |
| 5,816,743 A * | 10/1998 | Schmitz, Jr. | F16N 31/006 | 405/53 |
| 5,820,762 A * | 10/1998 | Bamer | E03F 5/0404 | 210/255 |
| 5,833,862 A * | 11/1998 | Holland | B01D 53/0407 | 210/DIG. 5 |
| D403,060 S * | 12/1998 | Flor | D23/355 | |
| 5,849,198 A * | 12/1998 | Sharpless | C02F 1/285 | 210/247 |
| 5,863,440 A * | 1/1999 | Rink | C02F 1/681 | 210/923 |
| 5,874,008 A * | 2/1999 | Hirs | B01D 17/0208 | 210/708 |
| 5,906,572 A * | 5/1999 | Holland | C02F 1/681 | 588/259 |
| 5,908,558 A * | 6/1999 | Holland | C02F 1/288 | 210/DIG. 5 |
| 5,927,955 A * | 7/1999 | Janesky | F04B 49/025 | 222/383.2 |
| 5,928,524 A * | 7/1999 | Casola | B01D 17/0211 | 210/DIG. 5 |
| 5,935,444 A * | 8/1999 | Johnson | B01D 17/0214 | 210/170.03 |
| 5,935,445 A * | 8/1999 | Febres | B01D 17/0205 | 210/776 |
| 5,935,447 A * | 8/1999 | Febres | B01D 17/041 | 210/708 |
| 5,948,266 A * | 9/1999 | Gore | E02B 15/048 | 210/800 |
| 5,958,226 A * | 9/1999 | Fleischmann | E03F 1/00 | 210/489 |
| 5,967,174 A * | 10/1999 | MacDonald | B67D 7/3209 | 141/86 |
| 5,993,372 A * | 11/1999 | Holland | F16N 31/004 | 588/900 |
| 6,004,470 A * | 12/1999 | Abril | B01D 17/0214 | 210/167.04 |
| 6,021,792 A * | 2/2000 | Petter | B08B 3/026 | 134/109 |
| 6,027,653 A * | 2/2000 | Holland | C02F 1/58 | 210/DIG. 5 |
| 6,056,881 A * | 5/2000 | Miller | B01D 17/08 | 210/485 |
| 6,059,208 A * | 5/2000 | Struthers | E03F 5/26 | 241/46.01 |
| 6,071,420 A * | 6/2000 | Martinsen | B01D 17/0208 | 210/801 |
| 6,080,307 A * | 6/2000 | Morris | E03F 5/0404 | 210/283 |
| 6,099,723 A * | 8/2000 | Morris | E03F 1/00 | 210/170.03 |
| 6,106,707 A * | 8/2000 | Morris | B01D 17/00 | 210/337 |
| 6,139,730 A * | 10/2000 | Buehler | B01D 17/0208 | 210/167.01 |
| 6,143,172 A * | 11/2000 | Rink | B01D 17/0205 | 210/241 |
| 6,164,298 A * | 12/2000 | Petter | B60S 3/044 | 134/104.4 |
| 6,164,315 A * | 12/2000 | Haslock | F04B 23/021 | 137/565.17 |
| 6,180,010 B1 * | 1/2001 | Alper | B01J 20/328 | 210/799 |
| 6,200,484 B1 * | 3/2001 | McInnis | E03F 5/0401 | 210/170.03 |
| D441,067 S * | 4/2001 | Flor | D23/365 | |
| 6,217,757 B1 * | 4/2001 | Fleischmann | E03F 5/0404 | 210/166 |
| 6,235,201 B1 * | 5/2001 | Smith | B01D 17/0214 | 210/112 |

(56) References Cited

U.S. PATENT DOCUMENTS

| | | | | |
|---|---|---|---|---|
| 6,305,410 B1* | 10/2001 | Cook | E03F 5/22 | 137/565.17 |
| 6,308,924 B1* | 10/2001 | Janesky | F04D 29/606 | 248/548 |
| 6,309,539 B1* | 10/2001 | Mayer | C02F 3/288 | 210/138 |
| 6,337,016 B1* | 1/2002 | Alper | C02F 1/288 | 210/512.1 |
| 6,337,025 B1* | 1/2002 | Clemenson | B01J 39/24 | 210/170.03 |
| 6,358,422 B1* | 3/2002 | Smith | B01D 29/54 | 210/252 |
| 6,368,499 B1* | 4/2002 | Sharpless | E03F 1/00 | 210/164 |
| 6,398,951 B1* | 6/2002 | Smith | B01D 35/143 | 210/291 |
| 6,398,966 B1* | 6/2002 | Smith | B01D 35/143 | 210/691 |
| 6,409,924 B1* | 6/2002 | Johnson | B01D 17/0202 | 210/691 |
| 6,485,639 B1* | 11/2002 | Gannon | B01J 20/261 | 210/170.03 |
| 6,503,390 B1* | 1/2003 | Gannon | B01D 17/0202 | 210/170.03 |
| 6,537,446 B1* | 3/2003 | Sanguinetti | E03F 5/0404 | 210/474 |
| 6,572,762 B2* | 6/2003 | Maxwell | B01D 17/005 | 210/90 |
| 6,712,553 B1* | 3/2004 | Niedermeyer | E02D 31/02 | 405/41 |
| 6,719,910 B1* | 4/2004 | Thiem | C02F 1/288 | 210/702 |
| 6,793,811 B1* | 9/2004 | Fleischmann | E03F 1/00 | 210/170.03 |
| 6,841,077 B2* | 1/2005 | Gannon | B01D 15/00 | 210/170.03 |
| 6,854,479 B2* | 2/2005 | Harwood | F04D 13/16 | 137/574 |
| 6,902,678 B2* | 6/2005 | Tipton | B63J 4/002 | 210/195.1 |
| 7,001,507 B2* | 2/2006 | Orozco | B01D 29/58 | 210/170.03 |
| 7,014,755 B2* | 3/2006 | Muir | E03F 1/00 | 210/283 |
| 7,033,496 B2* | 4/2006 | Thacker | B01D 17/0211 | 210/538 |
| 7,041,213 B1* | 5/2006 | McClanahan | E03F 5/18 | 210/170.03 |
| 7,128,831 B2* | 10/2006 | Newman | E03F 1/002 | 210/163 |
| 7,160,444 B2* | 1/2007 | Peters, Jr. | C02F 1/42 | 210/264 |
| 7,186,333 B2* | 3/2007 | Kluge | E03F 1/00 | 210/691 |
| 7,264,449 B1* | 9/2007 | Harned | F04D 15/0218 | 417/366 |
| 7,297,267 B2* | 11/2007 | Denton | B01D 17/0202 | 210/317 |
| 7,297,279 B2* | 11/2007 | Johnson | B01D 17/045 | 210/DIG. 5 |
| 7,303,085 B2* | 12/2007 | Lindsey | B01D 17/0214 | 210/DIG. 5 |
| 7,416,667 B2* | 8/2008 | Benachenou | B01D 17/045 | 210/DIG. 5 |
| 7,479,221 B2* | 1/2009 | Paoluccio | E03F 1/00 | 210/163 |
| 7,485,218 B2* | 2/2009 | Dussich, I | E03F 1/00 | 210/255 |
| 7,520,736 B2* | 4/2009 | Pohler | E03F 5/22 | 417/40 |
| 7,527,738 B2* | 5/2009 | Gonzalez | E04H 5/04 | 210/283 |
| 7,540,953 B2* | 6/2009 | Fitzgerald | C02F 1/004 | 210/170.03 |
| 7,563,082 B2* | 7/2009 | Pohler | F04B 49/04 | 417/40 |
| 7,578,930 B2* | 8/2009 | Williamson | C02F 9/00 | 210/534 |
| 7,588,689 B2* | 9/2009 | Paoluccio | E03F 1/00 | 210/660 |
| 7,624,892 B2* | 12/2009 | Daley | E03F 5/02 | 220/669 |
| 7,635,435 B2* | 12/2009 | Benachenhou | B01D 17/0214 | 210/791 |
| 7,686,540 B2* | 3/2010 | Urriola | E01C 11/228 | 405/53 |
| 7,802,741 B2* | 9/2010 | Werner | F04D 15/0254 | 241/46.08 |
| 7,837,869 B2* | 11/2010 | Peters, Jr. | E03F 5/0404 | 210/170.03 |
| 7,874,764 B2* | 1/2011 | Fossen | B65D 90/511 | 405/60 |
| 7,943,040 B2* | 5/2011 | Taylor | C02F 1/008 | 210/182 |
| 8,012,346 B2* | 9/2011 | Peters, Jr. | E03F 1/00 | 210/170.03 |
| 8,051,873 B2* | 11/2011 | Mullen | E03F 5/22 | 137/371 |
| 8,074,911 B2* | 12/2011 | Capano | F04D 15/0218 | 73/290 R |
| 8,091,728 B2* | 1/2012 | Burwell | E03F 11/00 | 52/169.7 |
| 8,101,071 B2* | 1/2012 | Spangler | B01D 17/0217 | 210/207 |
| 8,137,564 B2* | 3/2012 | Gannon | B01J 20/26 | 210/259 |
| 8,158,010 B2* | 4/2012 | Pearse | E03F 5/125 | 210/799 |
| 8,168,064 B2* | 5/2012 | Peters, Jr. | E03F 5/06 | 210/170.03 |
| 8,292,602 B2* | 10/2012 | Janesky | F04D 29/606 | 417/423.3 |
| 8,297,466 B2* | 10/2012 | Daley | E03F 11/00 | 220/567.1 |
| 8,323,506 B2* | 12/2012 | Gannon | B01D 17/10 | 210/283 |
| 8,438,731 B2* | 5/2013 | Peters, Jr. | E03F 5/06 | 210/170.03 |
| 8,480,888 B2* | 7/2013 | Ashley | C02F 1/78 | 210/167.01 |
| 8,523,532 B1* | 9/2013 | Pohler | E03F 5/00 | 417/40 |
| 8,529,228 B1* | 9/2013 | Thompson | F04D 15/0218 | 417/40 |
| 8,721,895 B2* | 5/2014 | Benachenou | B01D 17/045 | 210/671 |
| 8,746,492 B2* | 6/2014 | Daley | F17C 9/00 | 220/567.1 |
| 8,807,957 B2* | 8/2014 | Hampton | F04D 9/001 | 417/63 |
| 8,858,199 B2* | 10/2014 | Janesky | F04D 29/606 | 417/423.3 |
| 8,888,465 B1* | 11/2014 | Pohler | E03F 5/22 | 417/40 |
| 8,889,000 B2* | 11/2014 | Hannemann | E03F 5/14 | 210/170.03 |
| 8,974,662 B2* | 3/2015 | Gannon | C02F 1/285 | 210/170.03 |
| 9,004,381 B2* | 4/2015 | Schmidt | F04D 7/045 | 417/430 |
| 9,017,553 B2* | 4/2015 | Mason | C02F 1/285 | 210/167.25 |
| 9,097,390 B1* | 8/2015 | Ward | F17D 1/08 | |
| 9,383,244 B2* | 7/2016 | Bishop | G01F 23/14 | |
| 9,441,632 B2* | 9/2016 | Bishop | F04D 15/0072 | |
| 9,630,860 B2* | 4/2017 | DeChard | C02F 1/40 | |
| 9,638,193 B2* | 5/2017 | Bishop | F04D 15/0072 | |
| 9,646,735 B2 | 5/2017 | Adamson et al. | | |

(56) References Cited

U.S. PATENT DOCUMENTS

| | | | |
|---|---|---|---|
| 9,885,360 B2* | 2/2018 | Boese | F04D 15/0066 |
| 9,963,358 B2* | 5/2018 | Eberly | B01D 17/0214 |
| 10,174,493 B2* | 1/2019 | DeChard | B08B 17/025 |
| 10,174,495 B2* | 1/2019 | Peters | C02F 1/008 |
| 10,625,185 B1* | 4/2020 | Grice | C02F 1/28 |
| 10,640,398 B2* | 5/2020 | DeChard | B01D 17/0214 |
| 10,683,655 B2* | 6/2020 | Peters, Jr. | E03F 5/106 |
| 10,821,419 B2* | 11/2020 | Bazri | C02F 1/001 |
| 10,905,979 B2* | 2/2021 | Grice | B01D 29/111 |
| 10,907,340 B1* | 2/2021 | Conder | E03F 5/22 |
| 10,995,748 B2* | 5/2021 | Leonard | G05D 9/12 |
| 11,035,367 B1* | 6/2021 | Hansen | F04B 23/021 |
| 11,041,487 B2* | 6/2021 | Gray | F04B 15/02 |
| 11,124,936 B2* | 9/2021 | Ackles | B65D 90/24 |
| 11,179,753 B2* | 11/2021 | DeChard | C02F 1/40 |
| 11,208,992 B2* | 12/2021 | Coffey | F04B 15/02 |
| 11,220,636 B2* | 1/2022 | Moravec | B01J 20/262 |
| 11,325,062 B2* | 5/2022 | Gannon | B01D 29/23 |
| 11,346,094 B2* | 5/2022 | Lee | B01D 35/1435 |
| 11,389,757 B2* | 7/2022 | Gannon | B01J 20/3078 |
| 11,454,248 B1* | 9/2022 | Gessler | F04D 13/086 |
| 11,459,744 B2* | 10/2022 | Swope | C02F 1/001 |
| 11,661,367 B2* | 5/2023 | DeChard | C02F 9/00 210/799 |
| 11,686,060 B2* | 6/2023 | Ackles | F16N 31/00 210/153 |
| 11,905,941 B2* | 2/2024 | Coffey | E03F 5/22 |
| 11,976,455 B2* | 5/2024 | Gannon | E03F 5/0404 |
| 2002/0027096 A1* | 3/2002 | Smith | C02F 1/681 210/85 |
| 2002/0027106 A1* | 3/2002 | Smith | B01D 17/0202 210/691 |
| 2003/0029802 A1* | 2/2003 | Ruiz | C02F 1/681 210/693 |
| 2003/0034286 A1* | 2/2003 | Butler | E03F 5/0404 210/163 |
| 2003/0047522 A1* | 3/2003 | Gannon | B01D 15/00 210/799 |
| 2003/0047523 A1* | 3/2003 | Gannon | B01D 17/0202 210/799 |
| 2003/0094407 A1* | 5/2003 | de Ridder | E03F 5/14 210/120 |
| 2004/0060876 A1* | 4/2004 | Tipton | B63J 4/002 210/195.1 |
| 2004/0094209 A1* | 5/2004 | Harwood | E02D 31/02 137/565.29 |
| 2004/0112823 A1* | 6/2004 | Benachenou | B01D 17/045 210/285 |
| 2004/0222159 A1* | 11/2004 | Peters, Jr. | B01J 39/14 210/170.03 |
| 2004/0232057 A1* | 11/2004 | Orozco | B01D 29/15 210/86 |
| 2004/0234338 A1* | 11/2004 | Monroe | B67D 7/3218 405/52 |
| 2005/0034383 A1* | 2/2005 | Allen | E03F 5/22 52/200 |
| 2005/0051480 A1* | 3/2005 | Newman | E03F 1/002 210/615 |
| 2005/0051503 A1* | 3/2005 | Holland | B01D 17/045 210/791 |
| 2005/0082230 A1* | 4/2005 | Gonzales | F16N 31/002 210/690 |
| 2005/0199537 A1* | 9/2005 | Kluge | E03F 5/0404 210/164 |
| 2005/0230302 A1* | 10/2005 | Muir | B01D 35/04 210/290 |
| 2005/0281679 A1* | 12/2005 | Niedermeyer | F04D 15/029 417/423.3 |
| 2006/0054562 A1* | 3/2006 | Peters | B01J 39/14 210/170.03 |
| 2006/0093492 A1* | 5/2006 | Janesky | F04D 29/606 417/366 |
| 2006/0102543 A1* | 5/2006 | Peters | E03F 5/0404 210/170.03 |
| 2006/0163177 A1* | 7/2006 | Johnson | B01D 17/045 210/DIG. 5 |
| 2006/0207922 A1* | 9/2006 | Dussich | E03F 5/0404 210/164 |
| 2006/0231510 A1* | 10/2006 | Benachenhou | B01D 17/0208 210/DIG. 5 |
| 2006/0267336 A1* | 11/2006 | Peters, Jr. | E03F 5/06 285/85 |
| 2007/0084808 A1* | 4/2007 | Williamson | C02F 9/00 210/241 |
| 2008/0031751 A1* | 2/2008 | Littwin | F04B 49/025 417/411 |
| 2008/0031752 A1* | 2/2008 | Littwin | F04D 13/086 417/411 |
| 2008/0073277 A1* | 3/2008 | Paoluccio | E03F 5/0404 210/163 |
| 2008/0152430 A1* | 6/2008 | Flor | B01J 20/261 405/45 |
| 2009/0001022 A1* | 1/2009 | Spangler | B01D 17/0208 210/195.1 |
| 2009/0065442 A1* | 3/2009 | Taylor | C02F 9/20 210/195.1 |
| 2009/0095682 A1* | 4/2009 | Paoluccio | E03F 5/0404 210/660 |
| 2009/0178970 A1 | 7/2009 | Stanfel et al. | |
| 2009/0208345 A1* | 8/2009 | Moore | F04D 15/0209 417/6 |
| 2009/0324336 A1* | 12/2009 | Fossen | B65D 90/24 405/116 |
| 2010/0166570 A1* | 7/2010 | Hampton | F04D 15/0236 417/44.11 |
| 2010/0307984 A1* | 12/2010 | Mortensen | C02F 1/78 210/639 |
| 2010/0325862 A1* | 12/2010 | Peters, Jr. | E03F 5/06 29/428 |
| 2011/0036164 A1* | 2/2011 | Burdi | G01F 23/241 73/303 |
| 2011/0253641 A1* | 10/2011 | Pearse | E03F 5/125 210/232 |
| 2011/0265405 A1* | 11/2011 | Ksenych | B65D 90/24 52/264 |
| 2011/0290744 A1* | 12/2011 | Faulk, Jr. | C02F 1/004 210/252 |
| 2011/0311370 A1* | 12/2011 | Sloss | F04B 49/065 417/1 |
| 2012/0085688 A1* | 4/2012 | Schmidt | F04D 29/2288 210/119 |
| 2012/0103914 A1 | 5/2012 | Yuan | |
| 2012/0107137 A1* | 5/2012 | Early | E03F 5/22 417/1 |
| 2012/0211425 A1* | 8/2012 | Gannon | C02F 1/285 210/660 |
| 2012/0325734 A1* | 12/2012 | Gannon | B01J 20/261 210/282 |
| 2013/0186811 A1* | 7/2013 | Kaiser | E03F 5/0404 210/163 |
| 2013/0212932 A1* | 8/2013 | Bell | C10L 1/026 44/388 |
| 2013/0327716 A1* | 12/2013 | George | B01J 20/3071 210/671 |
| 2014/0196799 A1* | 7/2014 | Hsu | B65D 90/24 137/312 |
| 2014/0353310 A1* | 12/2014 | Perkins | B65D 90/046 220/4.12 |
| 2016/0122686 A1 | 5/2016 | Dietz | |
| 2016/0228793 A1* | 8/2016 | DeChard | C02F 1/40 |
| 2016/0281007 A1 | 9/2016 | Reams et al. | |
| 2016/0297688 A1* | 10/2016 | Hugonin | B01D 17/08 |
| 2017/0183859 A1* | 6/2017 | DeChard | C02F 1/001 |
| 2017/0246567 A1* | 8/2017 | Mabe, Jr. | B01D 29/925 |
| 2017/0297925 A1* | 10/2017 | Eberly | B01D 21/2444 |
| 2017/0321412 A1* | 11/2017 | Peters | G01N 27/10 |
| 2018/0280931 A1* | 10/2018 | Bazri | C02F 1/281 |
| 2019/0100446 A1* | 4/2019 | DeChard | B08B 3/14 |

(56) References Cited

U.S. PATENT DOCUMENTS

| | | | | |
|---|---|---|---|---|
| 2020/0206667 A1* | 7/2020 | Gannon | ................. | B01J 20/267 |
| 2020/0246844 A1* | 8/2020 | DeChard | ............... | B08B 17/025 |
| 2020/0256026 A1* | 8/2020 | Ackles | ...................... | C02F 1/40 |
| 2020/0406173 A1* | 12/2020 | Gannon | ............ | B01D 17/0202 |
| 2021/0322902 A1* | 10/2021 | Gannon | ................ | B01D 35/02 |
| 2021/0404132 A1* | 12/2021 | Ackles | ..................... | C02F 1/40 |
| 2022/0032214 A1* | 2/2022 | Morris | .............. | B01D 39/1623 |
| 2022/0033292 A1* | 2/2022 | DeChard | ........... | B01D 21/0012 |
| 2022/0096963 A1* | 3/2022 | Gannon | .................. | C02F 1/281 |
| 2022/0196012 A1* | 6/2022 | Gannon | ........... | B01D 39/1692 |
| 2022/0249991 A1* | 8/2022 | Gannon | ................ | B01D 29/03 |
| 2022/0349169 A1* | 11/2022 | Gannon | ............ | B01D 17/0202 |
| 2023/0332364 A1* | 10/2023 | Ackles | ................... | B63B 35/32 |

OTHER PUBLICATIONS

Comparatively Speaking: Lowering Surface Tension in Water vs. Oil; Aug. 3, 2010; Anthony J. O'Lenick Jr., Siltech; 1 page. (Year: 2010).*

* cited by examiner

| Test No. | Oil and Grease Result (mg/L) | Dilution |
|---|---|---|
| Test 1 | < 1.6 | 1.1 |
| Test 2 | 5.8 | 1.1 |
| Test 3 | 440,000 | 8 |
| Test 4 | 880,000 | 1 |
| Test 5 | 9.3 | 1.1 |
| Test 6 | 21 | 1.1 |
| Test 7 | 16 | 1.1 |
| Test 8 | 20 | 1.1 |
| Test 9 | 18 | 1.1 |
| Test 10 | 12 | 1.1 |
| Test 11 | 14 | 1.1 |
| Test 12 | 18 | 1.1 |
| Test 13 | 17 | 1.1 |
| Test 14 | 14 | 1.1 |
| Test 15 | 15 | 1.1 |
| Test 16 | 18 | 1.1 |
| Test 17 | 18 | 1.1 |
| Test 18 | 14 | 1.1 |
| Test 19 | 16 | 1.2 |
| Test 20 | <1.6 | 1.1 |
| Test 21 | 1.6 | 1.1 |
| Test 22 | 43,000 | 8 |
| Test 23 | 12 | 1.1 |
| Test 24 | 15 | 1.1 |
| Test 25 | 16 | 1.1 |

FIG. 1
PRIOR ART

| Test No. | Oil and Grease Result (mg/L) | Dilution |
|---|---|---|
| Test 1 | 2.5 | 1.4 |
| Test 2 | 2.1 | 1.3 |
| Test 3 | 2.2 | 1.3 |
| Test 4 | 2.1 | 1.3 |
| Test 5 | 2.4 | 1.3 |
| Test 6 | 3.2 | 1.3 |
| Test 7 | 3.7 | 1.3 |
| Test 8 | 3.5 | 1.3 |
| Test 9 | 3.5 | 1.3 |
| Test 10 | 3.9 | 1.2 |
| Test 11 | 2.7 | 1.2 |
| Test 12 | 3.1 | 1.3 |
| Test 13 | 4.3 | 1.3 |

FIG. 7

| Dynes/cm | METALS |
|---|---|
| 1103 | Copper |
| 840 | Aluminum |
| 753 | Zinc |
| 526 | Tin |
| 458 | Lead |
| 700-1100 | Stainless Steel |
| 250-500 | Glass |

| Dynes/cm | |
|---|---|
| 37 | PVA |
| 36 | Polystyrene |
| 36 | Acetal |
| 33 | EVA |
| 31 | Polyethylene |
| 29 | Polypropylene |
| 28 | Tedlar® |
| 18 | Teflon® |

| Dynes/cm | PLASTICS |
|---|---|
| 50 | Kapton® (Polymide) |
| 47 | Phenolic |
| 46 | Nylon |
| 45 | Alkyd Enamel |
| 43 | Polyester |
| 43 | Epoxy Paint |
| 43 | Polyurethane Paint |
| 42 | ABS |
| 42 | Polycarbonate |
| 39 | PVC (Polyvinyl Chloride) |
| 38 | Noryl® |
| 38 | Acrylic |
| 38 | Polane® Paint |

FIG. 8

Molecular Weight, Density, Surface Tension, and Viscosity for Selected Liquids

| Name | Molecular Formula | Mol. Wt. | Specific Density | Surface Tension | Viscosity cP | cs |
|---|---|---|---|---|---|---|
| Acetic acid (ethanoic acid) | C2H4O2 | 60.05 | 1.043 | 27 | 1.06 | 1.02 |
| Acetone (propanone) | C3H6O | 58.08 | 0.786 | 23 | 0.31 | 0.39 |
| Benzene | C6H6 | 78.11 | 0.873 | 28.2 | 0.6 | 0.69 |
| Cyclohexane | C6H12 | 84.16 | 0.773 | 24.7 | 0.89 | 1.15 |
| Dichloromethane (methylene chloride, DCM) | CH2Cl2 | 84.93 | 1.318 | 27.8 | 0.41 | 0.31 |
| Ethanol (ethyl alcohol) | C2H6O | 46.07 | 0.787 | 22 | 1.07 | 1.36 |
| Ethylene glycol | C2H6O2 | 62.07 | 1.111 | 48.4 | 16.1 | 14.5 |
| Formamide (methanomide) | CH3NO | 45.04 | 1.129 | 57 | 3.34 | 2.96 |
| Glycerol | C3H8O3 | 92.09 | 1.257 | 76.2 | 934 | 743 |
| Hydrogen peroxide | H2O2 | 34.02 | 1.449 | 74 | 1.25 | 0.86 |
| Mercury | Hg | 200.59 | 13.63 | 474.4 | 1.53 | 0.11 |
| Methanol (methyl alcohol) | CH4O | 32.04 | 0.787 | 22.1 | 0.54 | 0.69 |
| Nitromethane | CH3NO2 | 61.04 | 1.129 | 36.3 | 0.63 | 0.56 |
| Toluene | C7H8 | 92.14 | 0.865 | 27.9 | 0.56 | 0.65 |
| 1,1,1-Trichloroethane (methyl chloroform) | C2H3Cl3 | 133.4 | 1.33 | 25 | 0.79 | 0.59 |
| Trichloroethylene (TCE, trichloroethene) | C2HCl3 | 131.39 | 1.458 | 28.7 | 0.55 | 0.38 |
| Trichloromethane (chloroform) | CHCl3 | 119.38 | 1.48 | 26.7 | 0.54 | 0.36 |
| Water | H2O | 18.02 | 0.999 | 72.7 | 0.89 | 0.89 |

FIG. 9

| Test No. | Oil and Grease Result (mg/L) | Dilution |
| --- | --- | --- |
| Test 1 | 1.4 | 1 |
| Test 2 | < 1.4 | 1 |
| Test 3 | < 1.5 | 1 |
| Test 4 | < 1.4 | 1 |
| Test 5 | < 1.4 | 1 |
| Test 6 | 1.4 | 1 |
| Test 7 | 1.6 | 1 |
| Test 8 | 2.1 | 1 |
| Test 9 | 1.9 | 1 |
| Test 10 | 1.5 | 1 |
| Test 11 | < 1.4 | 1 |
| Test 12 | 1.4 | 1 |
| Test 13 | 1.9 | 1 |
| Test 14 | 1.6 | 1 |
| Test 15 | < 1.4 | 1 |
| Test 16 | < 1.4 | 1 |
| Test 17 | 1.6 | 1 |

FIG. 10

GRAVITY FLOW FILTRATION OF HYDROCARBONS FROM AN OIL-IN-WATER EMULSION

BACKGROUND OF THE INVENTION

1. Field of the Invention

The present invention relates to filtration media for use in removing and/or solidifying synthetic ester-based fluids from liquids, such that the resultant liquids may be free from such oils and solvents after filtering. More specifically, the present invention relates to a sump pump system meant for separating synthetic ester-based fluids from a liquid emulsion, such as an oil-water emulsion.

2. Description of Related Art

Today's escalation in power demands pushes oft-aging power grid networks to their limits, causing unprecedentedly high failure rates in their technologies, such as catastrophic failures in large power transformers. In these situations, mineral-oil-based dielectric insulating fluids have demonstrated costly limitations. For instance, mineral-oil-filled transformer explosions and fires causing heavy collateral damage have raised major safety concerns. There have also been major environmental concerns over the toxic effects of uncontained mineral oil spills. This has given rise to a new class of alternative dielectric insulating fluids (ester oils) that have historically been developed to answer these specific concerns, but present unique problems of their own.

In order to prevent contamination of the environment by oils and solvents, in many commercial and industrial applications and installations, spill containment systems are built that not only trap the potential spilled liquids but also any process liquid or rain/snow-melt liquid that comes in contact with the spill containment area. Federal, State, and local regulations that mandate spill protection to minimize or eliminate contaminated discharges to the environment require engagement at the spill site, such as the implementation of containment and filtration methods and systems.

One such example of a spill containment and filtration system is Solidification Products, International, Inc.'s Pump-Thru Barrier™, identified as U.S. Pat. No. 8,974,662 issued to Gannon on Mar. 10, 2015, titled "FILTRATION OF A PUMPED HYDROCARBON CONTAINING LIQUID", which teaches an apparatus for, and method of, filtering hydrocarbon contaminated water, and which may be used in drainage openings, particularly in parking lots, and contaminant areas for large sources of hydrocarbons, such as oil tanks or electrical transformers. The Pump-Thru Barrier™ automatically activates as fluid flow and levels within the containment area build up. An automated sump pump having a shutoff valve disposed thereon leads fluid into the sump pump barrier, the fluid typically comprises, for example, a combination of water and oil. An outlet conduit is disposed near the bottom of the sump pump barrier for egressing water, and an overflow conduit disposed near the top of the sump pump barrier recycles overflowing water and oil/sheen mix back into the containment area. Disposed within the sump pump barrier between the automated sump pump/overflow conduit and outlet conduit is a filter media housing, which contains a hydrocarbon absorption media capable of absorbing/adsorbing hydrocarbons/sheen present in water, while simultaneously allowing water to pass through. Such hydrocarbon media is identified in U.S. Pat. No. 6,503,390 issued to Gannon on Jan. 7, 2003, titled "FILTRATION OF HYDROCARBON CONTAINING LIQUID".

Thus, oil/sheen leaks occurring within a containment area that begin to overflow due to excess water buildup create an emulsion that gets introduced into the sump pump barrier via the automated sump pump. The sump pump barrier will take in the emulsion, separating the water and allowing it to egress through the outlet conduit, while the hydrocarbon absorption filter media disposed within the filter media housing absorbs/adsorbs the oil/sheen. Eventually, the filter media will prevent any further liquids from passing through the sump pump barrier due to a complete absorption/adsorption of sheen and resultant solidification of the filter media, and will thus recycle the remaining overflowing emulsion back into the containment area so as to prevent any oils/sheen from leaving the site. Only clean, filtered water is able to pass through the sump pump barrier and escape the containment area.

Present day power plants use natural and/or synthetic ester-based fluids to greatly improve electrical performance and cooling capabilities in their transformers. Ester-based fluids may also be used as lubricants, and as hydraulic fluids. The use of natural esters (which are typically oil based) at these plants presents the possibility of fluid spills occurring on-site, which creates a risk of environmental contamination. Natural esters may also be flammable or present poor biodegradable properties, among other issues. Synthetic ester-based fluids have thus been created in response to the issues commonly caused by the use of natural esters.

Synthetic based ester oil is oil that has been chemically synthesized. Typically, synthetic ester-based fluids are used in such applications as passenger car air-conditioning compressors, refrigerators, and transformers, and in other industrial applications. Synthetic esters are prized for their ability to lubricate at high temperatures. One of the main reasons for this is that they have a much lower volatility than other lubricant based oils at a given viscosity. Volatility is strongly related to smoke point, flash point, and fire point. Ester oils are generally utilized as a replacement for mineral oil in distribution and power class transformers.

Although these synthetic ester-based fluids are deemed to be non-hazardous and biodegradable, a formulation can include hundreds of additives, which address performance issues specific to their application and performance shortcomings of the base oil. Additives are commonly used to address oxidative aging, corrosion, high pressure, low or high temperature conditions, phase transition, shear, foaming, and hydrolysis (particularly for vegetable and synthetic ester-based oils). Consequently, the need exists for total synthetic ester-based fluid containment technology in the event that a failure occurs which requires immediate containment.

Generally, graphene has been utilized as a filler for composite materials due in part to its intrinsic mechanical, thermal, and electrical properties. For example, graphene's lack of solubility in substantially all solvents has led to the common practice of either using graphene oxide or reduced graphene oxide in lieu of pristine graphene sheets.

In U.S. Pat. No. 9,646,735 issued to Adamson, et al. on May 9, 2017, titled "GRAPHENE/GRAPHITE POLYMER COMPOSITE FOAM DERIVED FROM EMULSIONS STABILIZED BY GRAPHENE/GRAPHITE KINETIC TRAPPING" (the "'735 Patent") the graphene/graphite stabilized composite disclosed was tested for use in the sump pump barrier (e.g., graphene/graphite stabilized emulsion-templated foam composite), and has been used to make foam composites that have shown bulk conductivities up to about 2 S/m, as well as compressive moduli up to about 100 MPa and breaking strengths of over 1200 psi with densities as low as about 0.25 g/m$^3$.

The aforementioned graphene/graphite material may be formed as an adsorption/absorption media to achieve desirable results when exposed to mineral oils or natural ester oils. However, the behavior with certain synthetic ester oils is inadequate, especially when emulsified with water due to a very similar density and a very similar polarity to water, as opposed to mineral oils.

Thus, although the graphene/graphite polymer composite foam of the '735 Patent described above is promising for potential application to natural esters, there are limitations and unique challenges to the application of this composite for applications requiring the containment of synthetic ester-based fluids. The United States Environmental Protection Agency (the "EPA") requires the discharge of water containing oil (including natural ester-based and synthetic ester-based fluids) from power plants to be below 15 parts per million ("ppm"), which is tested utilizing EPA test method 1664A. The inability of this graphene/graphite polymer composite to filter/remove effectively synthetic ester-based fluids from emulsions was confirmed through a series of lab tests conducting EPA test method 1664A, such test results provided in prior art FIG. 1.

Problems regarding the installation and structure of filtration assemblies, and their ability to handle certain flows/volumes of fluid while properly filtering synthetic oils are present in the prior art. For example, the aforementioned sump pump barrier utilizing the hydrocarbon absorption media works well in handling and filtering high flow/volumes of water and sheen emulsions, but is less effective when the emulsion introduced into the sump pump barrier is comprised of synthetic ester-based fluids. Furthermore, the graphene/graphite polymer composite foam of the prior art cannot effectively absorb these synthetic ester-based fluids when paired to work with the sump pump barrier either as a replacement filtration media (for the hydrocarbon absorption media) or as a polishing filter media.

SUMMARY OF THE INVENTION

Bearing in mind the problems and deficiencies of the prior art, it is therefore an object of the present invention to provide a sump pump barrier and polishing filter apparatus that allows for a steady flow rate of water and sealing in the presence of an overloaded supply of synthetic ester-based fluid and water emulsions.

It is another object of the present invention to provide a method of filtering/sealing synthetic ester-based fluids from an emulsion.

A further object of the invention is to provide a sump pump system for receiving an emulsion that filters synthetic ester fluids from water or other liquids.

Yet another object of the invention is to provide a new permutation/formulation of media effective against all oils, including mineral, natural, and/or synthetic esters.

Still other objects and advantages of the invention will in part be obvious and will in part be apparent from the specification.

The above and other objects, which will be apparent to those skilled in the art, are achieved in the present invention which is directed to a sump pump system for the filtration of synthetic ester-based fluids from an emulsion. The system comprises a sump pump barrier having an outlet conduit for the flow of fluid therethrough. A polishing filter apparatus includes a polishing filter disposed in a polishing filter barrier, having a polishing filter inlet conduit fluidly connected to the sump pump barrier outlet conduit for the ingress of the fluid into the polishing filter, and a polishing filter outlet conduit for the egress of a filtered fluid. Said polishing filter is disposed within the polishing filter barrier of said polishing filter apparatus, and is connected to the polishing filter conduit. The polishing filter has a polishing filter cartridge disposed therein, the cartridge which contains a hydrophilic composition for the removal of synthetic ester-based fluid having a surface tension dissimilar to water, and further having a surface energy greater than or equal to 35 dynes per centimeter. The fluid flows through the sump pump barrier and into the polishing filter barrier via the sump pump barrier outlet conduit and polishing filter inlet conduit, and is pumped into the polishing filter. It is then filtered via the polishing filtered cartridge within the polishing filter housing, and the resultant filtered fluid exiting the polishing filter barrier via the polishing filter barrier outlet conduit contains less than 5 ppm of said synthetic ester-based fluids.

In an embodiment, the composition contained within the filter cartridge may include polyether sulfone or a glass fiber media. The composition contained within the filter cartridge may be a filter media having a surface energy greater than or equal to 45 dynes per centimeter. The system may further include a shutoff valve disposed on one of the pump conduit and polishing filter conduit, the shutoff valve being interactive to open/close the flow of fluids through said pump conduit and polishing filter conduit.

In a further embodiment, the sump pump system may further include a polishing filter barrier cover for disposal over the top surface of the polishing filter barrier. A shutoff valve access hole may be carved into the polishing filter barrier cover for providing access to a shutoff valve disposed within the polishing filter barrier and disposed on one of the pump conduit and polishing filter conduit. A power cord access hole may be carved into the polishing filter barrier cover for allowing a power cord to lead into the polishing filter barrier and connect to the pump, supplying the pump with power. The sump pump system may further include a pump disposed within the polishing filter apparatus and connected to a pump conduit; the pump conduit further connected to said polishing filter.

The present invention is further directed to a method of filtering synthetic ester-based fluids from an emulsion. The method comprises the steps of: providing a sump pump barrier for receiving an emulsified fluid comprising water and synthetic ester-based fluid, wherein surface tension of the synthetic ester-based fluid is dissimilar to surface tension of said water, the sump pump barrier having an outlet conduit for the flow of the emulsified fluid therethrough; flowing the emulsified fluid through the sump pump barrier outlet conduit into a polishing filter apparatus via a polishing filter inlet conduit; pumping the emulsified fluid through a pump and a connecting polishing filter inlet conduit, the polishing filter inlet conduit further leading into a polishing filter, all of which are disposed within the polishing filter apparatus; filtering said synthetic ester-based fluid from the emulsified fluid flowing through the polishing filter inlet conduit into the polishing filter via a polishing filter cartridge disposed within said polishing filter of the polishing filter apparatus, the polishing filter cartridge containing a hydrophilic composition having a surface energy greater than or equal to 35 dynes per centimeter for the capture of the synthetic-ester based fluid resulting in a filtered fluid via the filtration of the emulsified fluid by the polishing filter cartridge; and egressing the filtered fluid from the polishing filter apparatus via a polishing filter outlet conduit.

In an embodiment, the composition contained within the filter cartridge hydrophilic composition may include polyether sulfone or a glass fiber media. The surface energy of the hydrophilic composition contained within the filter cartridge may be greater than or equal to 45 dynes per centimeter.

The present invention is still further directed to a polishing filter apparatus for the filtration of synthetic ester-based fluids from an emulsion. The polishing filter apparatus comprises a polishing filter, a polishing filter barrier, and an inlet conduit for receiving a flow of a fluid, said fluid comprising a synthetic ester based fluid and water emulsion, wherein the synthetic ester based fluid has a surface tension dissimilar to that of the water, and an outlet conduit for the egress of a resultant filtered fluid. A pump is disposed within the polishing filter barrier for pumping the fluid through a pump conduit. The polishing filter is disposed within the polishing filter apparatus and is fluidly connected to the polishing filter inlet conduit, and further includes a polishing filter housing and a polishing filter cartridge disposed therein. The polishing filter is fluidly connected to a polishing filter outlet conduit.

In an embodiment, the polishing filter apparatus may further include a polishing filter conduit connected to the pump conduit, and a shutoff valve disposed on one of the pump conduit and polishing filter conduit. A filter housing conduit stub for connecting the polishing filter to the polishing filter barrier outlet conduit may further be provided. The polishing filter apparatus may still further include a power cord leading into the polishing filter barrier and connecting to the pump for supplying the pump with power. The polishing filter apparatus may also include a polishing filter barrier cover having a shutoff valve access hole for easy accessibility to a shutoff valve disposed on one of the pump conduit and polishing filter conduit. A polishing filter barrier cover having a power cord access hole for allowing a power cord to lead into the polishing filter barrier and connect to the pump for supplying the pump with power may be provided as well.

In another embodiment, the polishing filter cartridge contains a hydrophilic filtration media composition capable of removing synthetic ester-based fluids from the fluid, such that a surface energy of the hydrophilic composition is greater than or equal to 35 dynes per centimeter. The polishing filter cartridge filtration media composition may be polyether sulfone or glass fiber. In still a further embodiment, the polishing filter cartridge filtration media composition has a surface energy greater than or equal to 45 dynes per centimeter.

BRIEF DESCRIPTION OF THE DRAWINGS

The features of the invention believed to be novel and the elements characteristic of the invention are set forth with particularity in the appended claims. The figures are for illustration purposes only and are not drawn to scale. The invention itself, however, both as to organization and method of operation, may best be understood by reference to the detailed description which follows taken in conjunction with the accompanying drawings in which:

FIG. 1 is a table of prior art laboratory results showing occasional inconsistent measurements of over 20 parts per million of synthetic ester-based fluid in a tested post-filtered water, the tested water being filtered by the prior art sump pump barrier described herein.

FIG. 7 is a table of laboratory results showing a consistent measurement of 5 parts per million or less of synthetic ester-based fluid in a tested post-filtered water; the tested water being filtered with the sump pump system of the present invention;

FIG. 8 is a table of surface energies for various materials;

FIG. 9 is a table of surface tensions for various liquids;

FIG. 10 is a table with test data samples demonstrating the efficiency of the current invention in the filtration of oils and synthetic esters from an emulsion at consistent measurements below 2 ppm;

DESCRIPTION OF THE EMBODIMENT(S)

Figure 2:
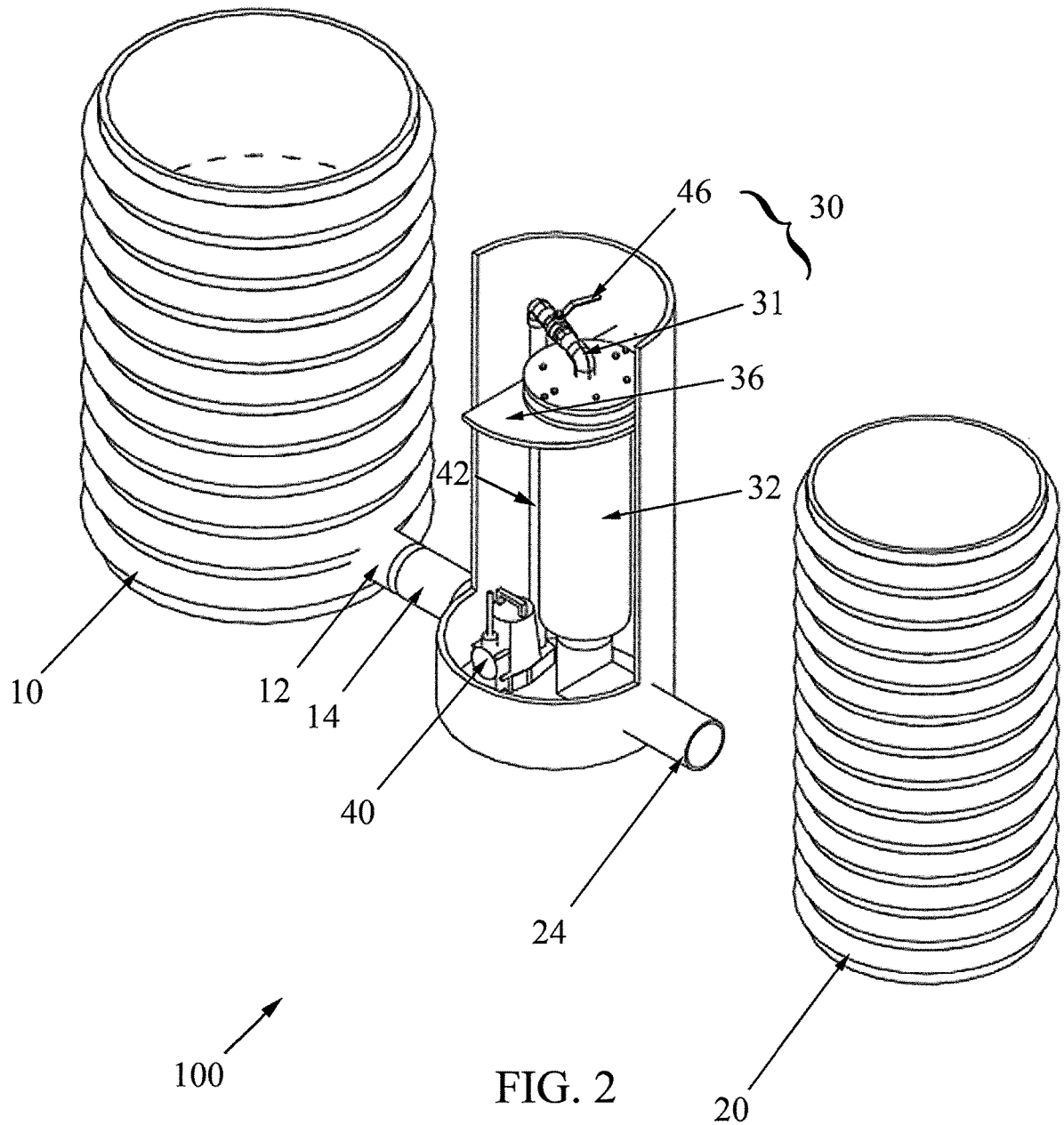
FIG. 2 is a perspective, partially exploded view of a sump pump system of the present invention with the polishing filter barrier separated from the polishing filter housing.

In describing the embodiment(s) of the present invention, reference will be made herein to FIGS. 1-13 of the drawings in which like numerals refer to like features of the invention.

The present invention explores the relationship between surface energy, surface tension, and filtration media porosity in order to create a sump pump barrier system capable of filtering any type of oil (e.g. mineral oil, synthetic ester, natural ester, etc.) from a liquid emulsion. Surface energy is essentially the measurement of disruption of intermolecular forces on a particular surface, ranging in measurements from high (e.g., copper) to low (e.g., Teflon or Polytetrafluoroethylene). Generally, the higher the measured surface energy, the more hydrophilic the surface or substrate, while the lower the measured surface energy, the more hydrophobic the surface or substrate is. FIG. 8 depicts a tabular view of exemplary surface energy measurements compiled by Steven Label of Santa Fe Springs, California USA (accessible at: stevenlabel.com). Surface tension relates to the measured tension of the surface "film" or "layer" of a liquid caused by the inter-molecular force of the liquid particles and their tendency to shrink into a minimum surface area. FIG. 9 depicts a tabular view of reference data compiled by Diversified Enterprises of Claremont, New Hampshire, USA (accessible at: accudynetest.com), displaying exemplary surface tension measurements of various liquids with water having a notably high surface tension measurement when compared to the majority of the other liquids shown.

The relationship between surface tension and surface energy is important in establishing the levels of attraction/repulsion between the media and the fluid. The higher the measured surface tension, the stronger the intermolecular attractions (and amount of energy needed to separate said attractions). Generally, a fluid with a higher surface tension is less likely to wet a filtration media with a low surface energy. Thus, the surface energy of a filtration media is a necessary measurement in determining the retention factor against fluids with a high surface tension. At adequately small dimensions of the filter media (porosity), this force can be utilized to retain desired fluids by appropriate selection of media. Therefore, matching high surface tension fluids to high surface energy filter media will effect the desired separation of oil from water.

The development of the synthetic ester emulsion filters began with an observation made during an attempted filtration of what was assumed to be particulate impurities in effluent from a barrier test. The presumed particulate matter was theorized to be high molecular weight fractions (and thus high boiling) of the surfactant (Span 80) used in the graphene/graphite polymer composite disclosed in the '735 Patent. Upon filtration of the visible particulates, an unexpected result was observed that particulates were absent. Instead, the presence of oil was identified and confirmed, as shown by the prior art lab results of FIG. 1, which depicts a tabular view of laboratory results in which oil and grease in a water sample was tested using United States Environmental Protection Agency ("EPA") test method 1664A. Further investigation led to the realization that the oil present was an ester transformer fluid (Midel® oil). The Midel® oil, due to its combined characteristics of relatively polar nature and its density of nearly 1 g/mL, forms a very stable emulsion with water especially when passed through a high rpm sump pump. Essentially, the dissimilarity of the surface tension of synthetic ester/Midel® oil (comparative to water, which is approximately 73 dynes/cm; see FIG. 9) to water forms a filtration media capable of retaining oil while simultaneously allowing water to bypass in a manner that meets or exceeds EPA regulations. Through further experimentation, it was found that a hydrophilic media composition was required to achieve this Since the material being held back was oil and not particulates, it is more probable that the mode of retention is not exclusion by physical size but rather by some other physical or chemical parameter. It was determined that the filter used was of a certain polymer membrane (polyether sulfone), which is noted for its very hydrophilic nature and hence high flow rates in aqueous systems. It was then determined that the polyether sulfone membrane was able to retain the ester oil (Midel® oil) in any concentration, whether or not it was emulsified, while allowing water to flow. It was further determined that other oils including standard transformer oils were similarly retained by this type of filter. Thus, the mode of separation was predicated on surface tension of the components relative to the surface energy of the membrane. The polyether sulfone membrane is very hydrophilic, having a relatively high surface energy—near that of water. This hydrophilic nature is what makes it very suitable for aqueous media. It is able to have relatively high flow rates compared to hydrophobic media at equivalent porosities.

Typically, challenges are presented where it is necessary to remove trace amounts of water from petroleum feedstock. Filter media that allows oil to pass but retains water is desirable; however, in such industries the opposite perspective has not been readily addressed in the same fashion—removing oil from a water feed. Moreover, the concept of the present invention of utilizing surface energy differentiation to drive separation of oil from water utilizing a hydrophilic filter media is unique to the art.

It has been determined that optimization of flow rate while maintaining oil retention is a necessary limitation. A limit was reached using polyether sulfone membrane filters wherein the available porosity of membranes is not able to economically achieve the flows required. Consequently, a new hydrophilic type of media was introduced into the system and tested. The new media, glass fiber, was very hydrophilic. It was able to perform as well as the polyether sulfone membrane in terms of oil retention and was more economically viable. It was also available in a wider range of porosities. Through various trials it was determined that a cartridge containing media at a porosity of between 0.2-20 μm was suitable for the pressures and flows of the barrier system that the filter supports.

Filtration media has become highly specialized for various purposes. Among the critical parameters in filtration is the relative hydrophilicity, or conversely hydrophobicity, of the media. Filters with highly hydrophilic media have been developed specifically to allow for greater flow (throughput) of aqueous solution at a given porosity. The physical parameter of surface energy, which is a property inherent to any given material, determines the relative hydrophilicity of a given media. Exemplary surface energy measurements of various compositions are provided in FIG. 8, and the relative surface tensions of various liquids are shown in FIG. 9. Materials with relatively high surface energy (e.g., copper) allow for greater water flow as water itself has a high surface tension (relative to most liquids; see FIG. 9). Materials of very low surface energy (e.g., Polytetrafluoroethylene; more commonly known as Teflon) will allow high flow of many organic liquids but will greatly resist the flow of aqueous solutions without being put through a process known as pre-wetting. Such materials (hydrophobic, low surface energy) are also susceptible to filter blinding (i.e., having the filtering fluid being unable to interact with the filter media) via de-wetting.

The present invention demonstrates how the effect of surface energy (in conjunction with appropriate porosity) can be used in a filtration system to separate effectively oils (typically having a very low surface tension) from water. The interplay between surface energy and porosity is selected and utilized to determine the ability of a filter to perform this task. Empirical evidence has demonstrated that the higher the surface energy of the filter media, the larger the pores can be and still successfully retain oil. Conversely, lower surface energy materials require smaller pore size in order to be effective. At a point, as the surface energy becomes lower, a filter may no longer be able to hold back the oil at all. Continuing the trend of decreasing surface energy relative to the fluid being filtered, it will be possible to have the low surface tension liquid pass while retaining the water from such a mixture (these are considered hydrophobic filters). As identified and supported by FIG. 8, it has been shown that the desirable hydrophilic composition has a surface energy greater than or equal to 35 dynes per centimeter, and in a majority of cases, greater than or equal to 45 dynes per centimeter.

Pump-Thru (Pressurized) Embodiment

A sump pump system 100 comprising a sump pump barrier 10 and a polishing filter apparatus 30, inclusive of a polishing filter barrier 20 with a polishing filter 32 disposed therein is provided. Sump pump barrier 10, as previously described above, comprises an outlet conduit 12 and a connecting fitting 14 for securing the connection between sump pump barrier 10 and polishing filter 32, which upon assembly is enclosed in polishing filter barrier 20, and forming polishing filter apparatus 30, as shown in FIGS. 2-6.

Figure 3:
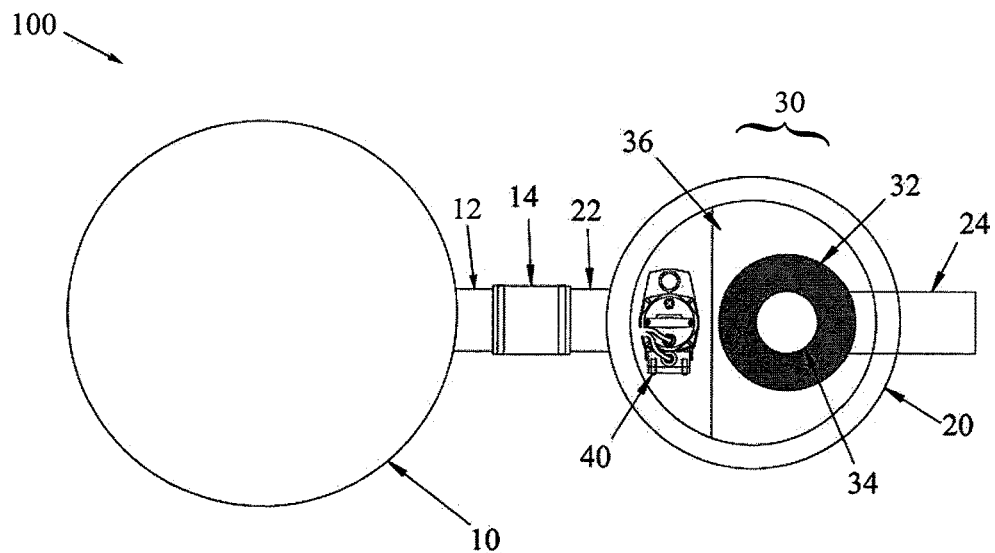
FIG. 3 is a top down, partially cross-sectional view of the sump pump system of FIG. 2.
Figure 4:
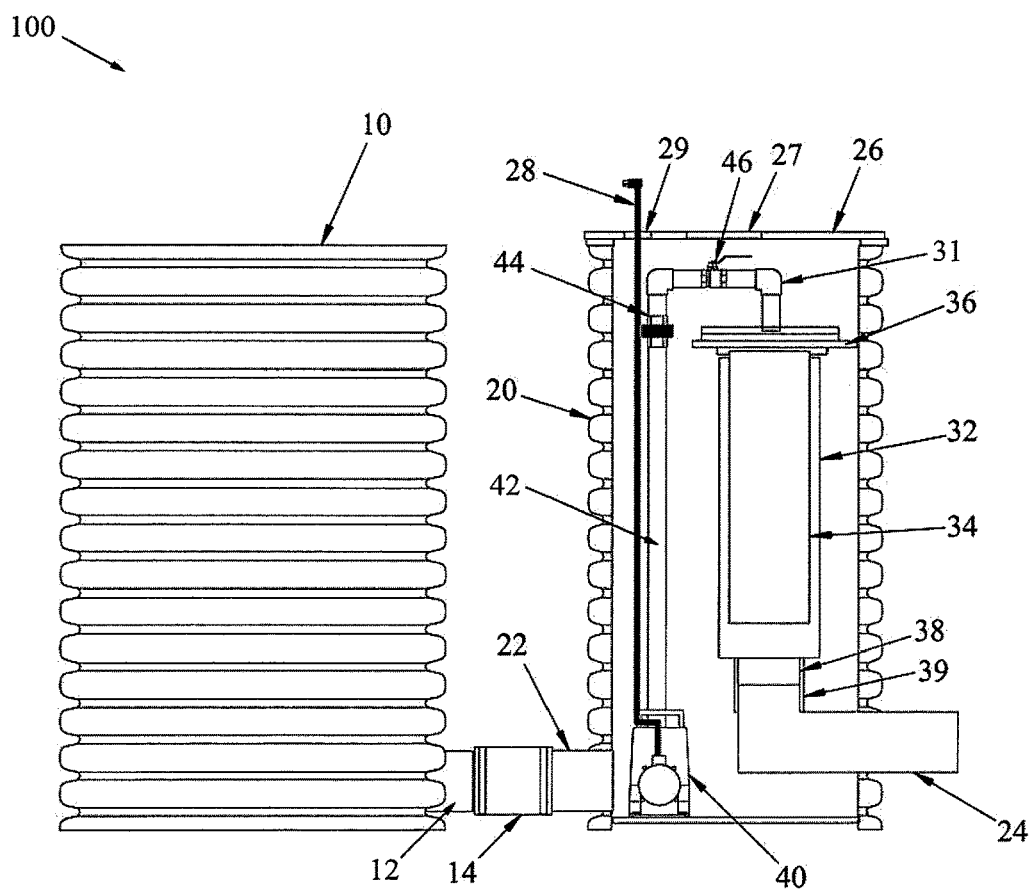
FIG. 4 is a side cross-sectional view of the sump pump system of FIG. 2.
Figure 5:
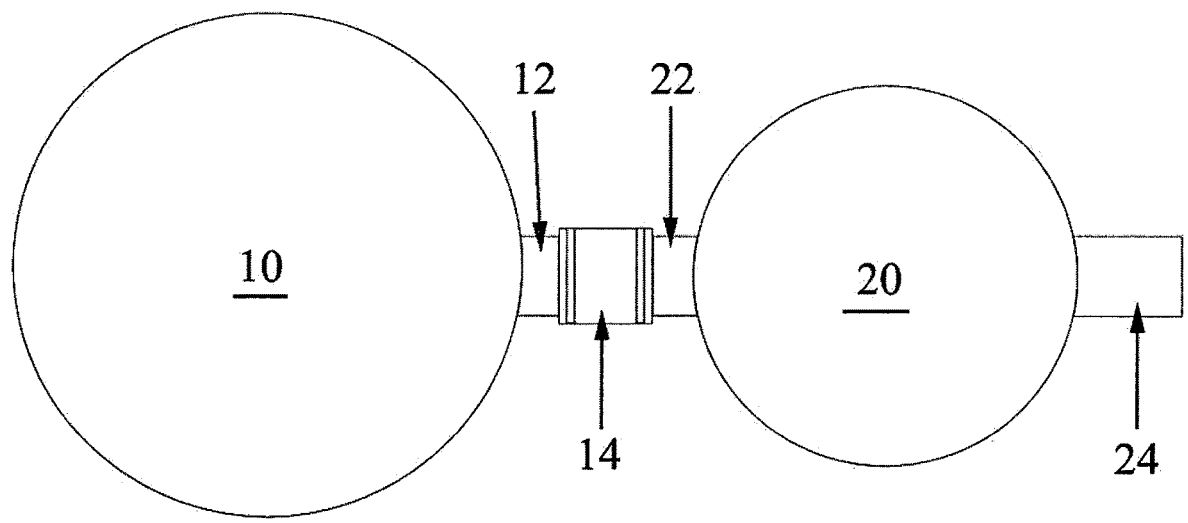
FIG. 5 is a top down view of the sump pump system of FIG. 2.
Figure 6:
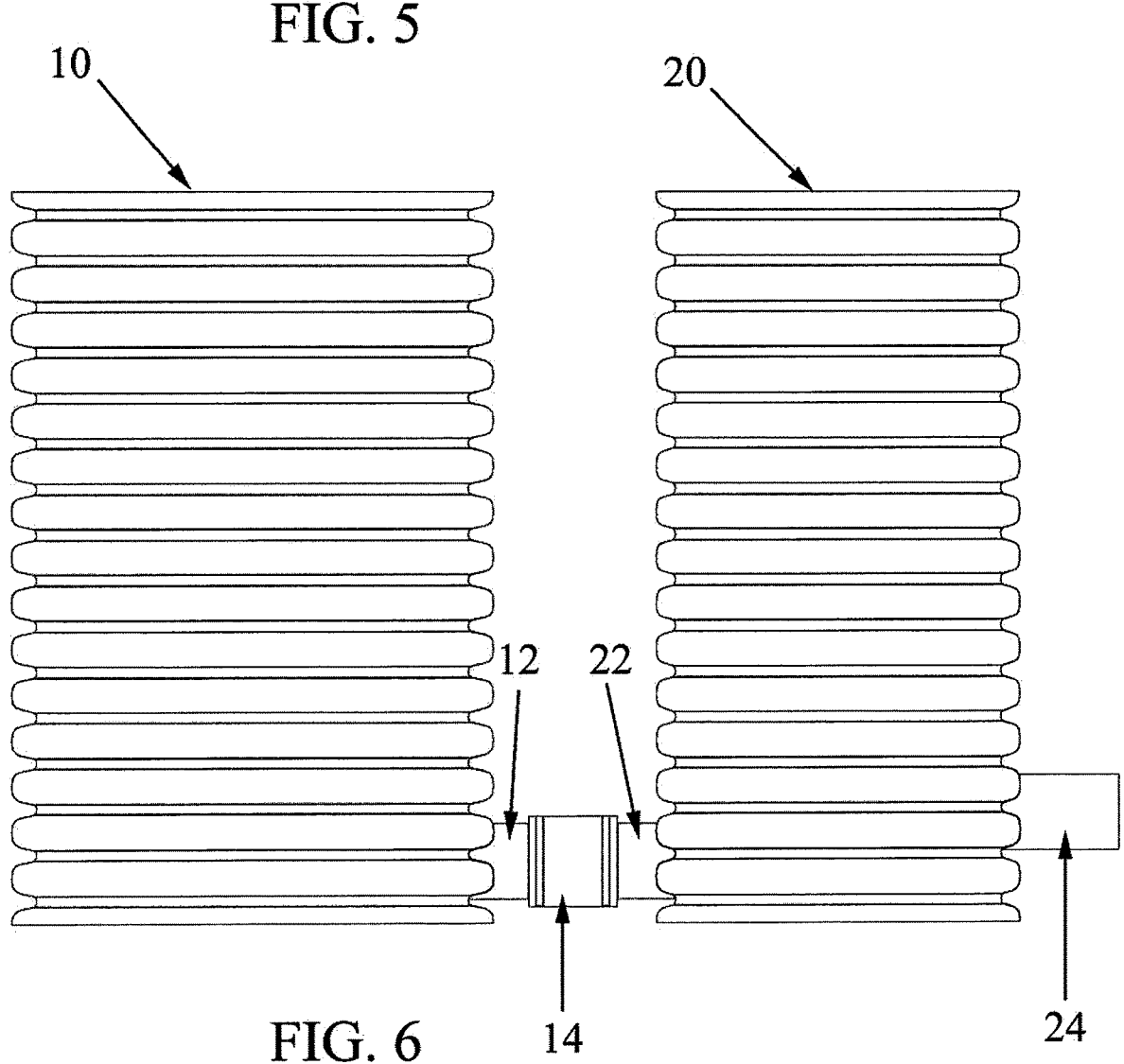
FIG. 6 is a side elevational view of the sump pump system of FIG. 2.

As depicted in FIG. 3, polishing filter inlet conduit 22 leads at one end into the polishing filter 32 and connects to the sump pump outlet conduit 12 via the connecting fitting 14 at the other end. Polishing filter barrier 20 is in mechanical communication with the polishing filter inlet conduit 22, an outlet conduit 24, and a barrier cover 26 for disposal over the top surface of the polishing filter barrier 20. Disposed within the polishing filter barrier 20 is a pump 40, from which leads a pump conduit 42 therefrom and connects to a polishing filter conduit 31 via a union fitting 44, or by any other acceptable fluid-tight connections. A shutoff valve 46 may be disposed anywhere along the polishing filter conduit 31 or pump conduit 42, the shutoff valve being interactive to open/close the flow of fluids through said conduits 31, 42. Shutoff valve 42 may be accessible to an end user through the polishing barrier cover 26, such as via a shutoff valve access hole 27 carved into the barrier cover 26. An optional power cord 28 leads from the outside of the polishing filter barrier 20 into the barrier via a power cord access hole 29 accessible through the polishing barrier cover 26, and connects to the pump 40 to supply power.

Polishing filter conduit 31 leads into a polishing filter 30, which is also disposed within the polishing filter barrier 20. The polishing filter apparatus 30 comprises the polishing filter 32 having a polishing filter cartridge 34 disposed therein. The polishing filter cartridge 34 may contain a media comprising polyether sulfone, glass fiber, or any other hydrophilic media capable of retaining/capturing/removing synthetic ester-based fluids. Alternatively, in at least one preferred embodiment, any filter media having a surface energy greater than or equal to 30 mJ/square meter may be used within the polishing filter cartridge 34. In another preferred embodiment, the filter media surface energy is greater than or equal to 45 mJ/square meter. A filter housing support 36 is disposed on the top surface of the polishing filter apparatus 30 from which the polishing filter conduit 31 is connected, and the polishing filter 32 is suspended on within the polishing filter barrier 20. A filter housing conduit stub 38 extends from the bottom edge of the filter housing 32, which leads into the outlet conduit 24. Conduit stub 38 is further secured to the outlet conduit 24 via a conduit stub fitting 39.

When a water and synthetic ester emulsion is pumped through the initial sump pump barrier 10, the majority of the synthetic ester is filtered out from the emulsion and absorbed by the filter media disposed within the sump pump barrier. However, given the problems with proper filtration of synthetic ester-based fluids as described above, some of this synthetic ester remains emulsified and egresses from the sump pump barrier 10 with the flowing water. This egressing water (still containing trace amounts of synthetic ester) will immediately enter the polishing filter barrier 20 of the present invention via the connection between the sump pump outlet conduit 12 and polishing filter barrier inlet conduit 22, and will begin to build up within the polishing filter barrier 20. The egressed water is then pumped upwards via the pump 40 through the pump piping 42, further through the polishing filter conduit 31, and into the polishing filter 32. The egressed water is then filtered of any remaining amounts of synthetic ester, to which the now purified water exits the polishing filter barrier 20 through the outlet conduit 24. Any overflow of emulsified fluids within the polishing filter barrier 20 may be addressed by activating the shutoff valve 46 to halt further flow of fluid.

Gravity Fed Embodiment

Figure 11:
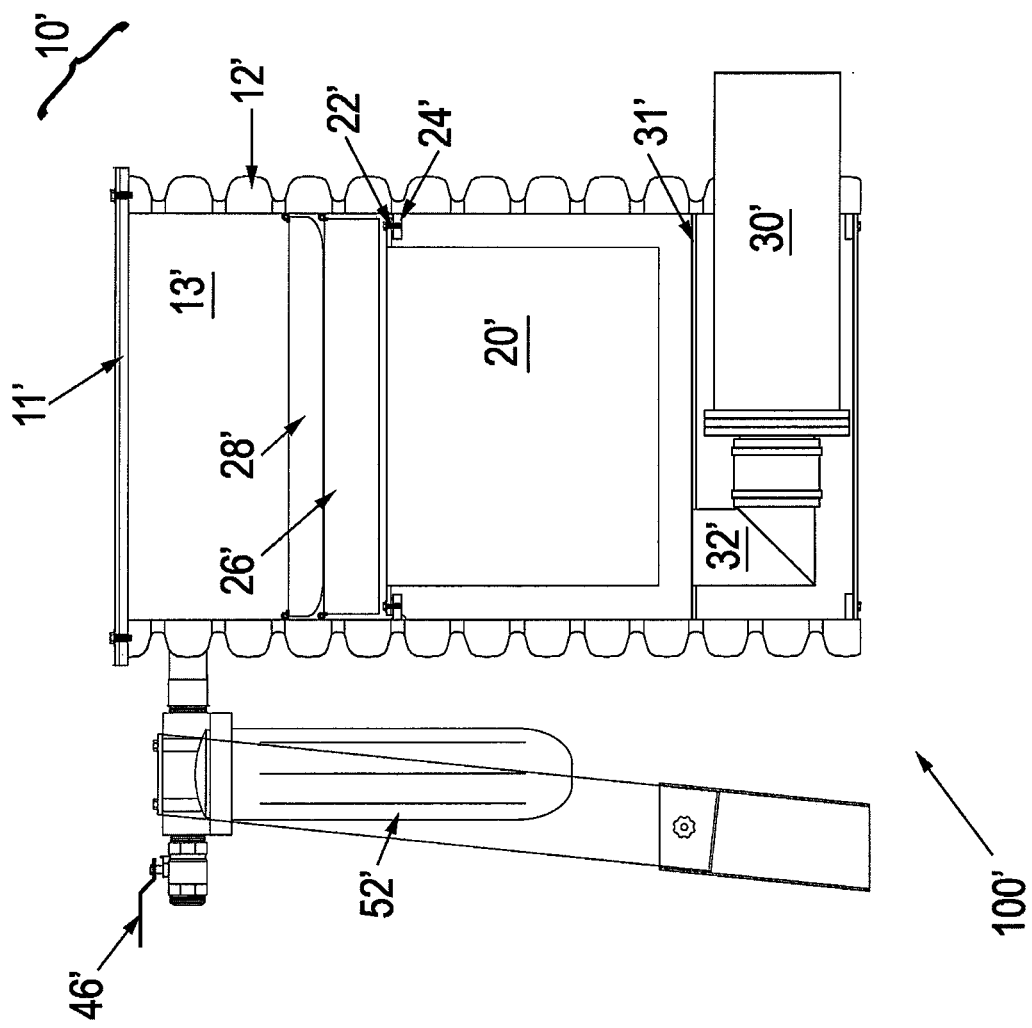
FIG. 11 is a side cross-sectional view of a gravity fed embodiment of a sump pump system of the present invention with the polishing filter barrier separated from the polishing filter housing.
Figure 12:
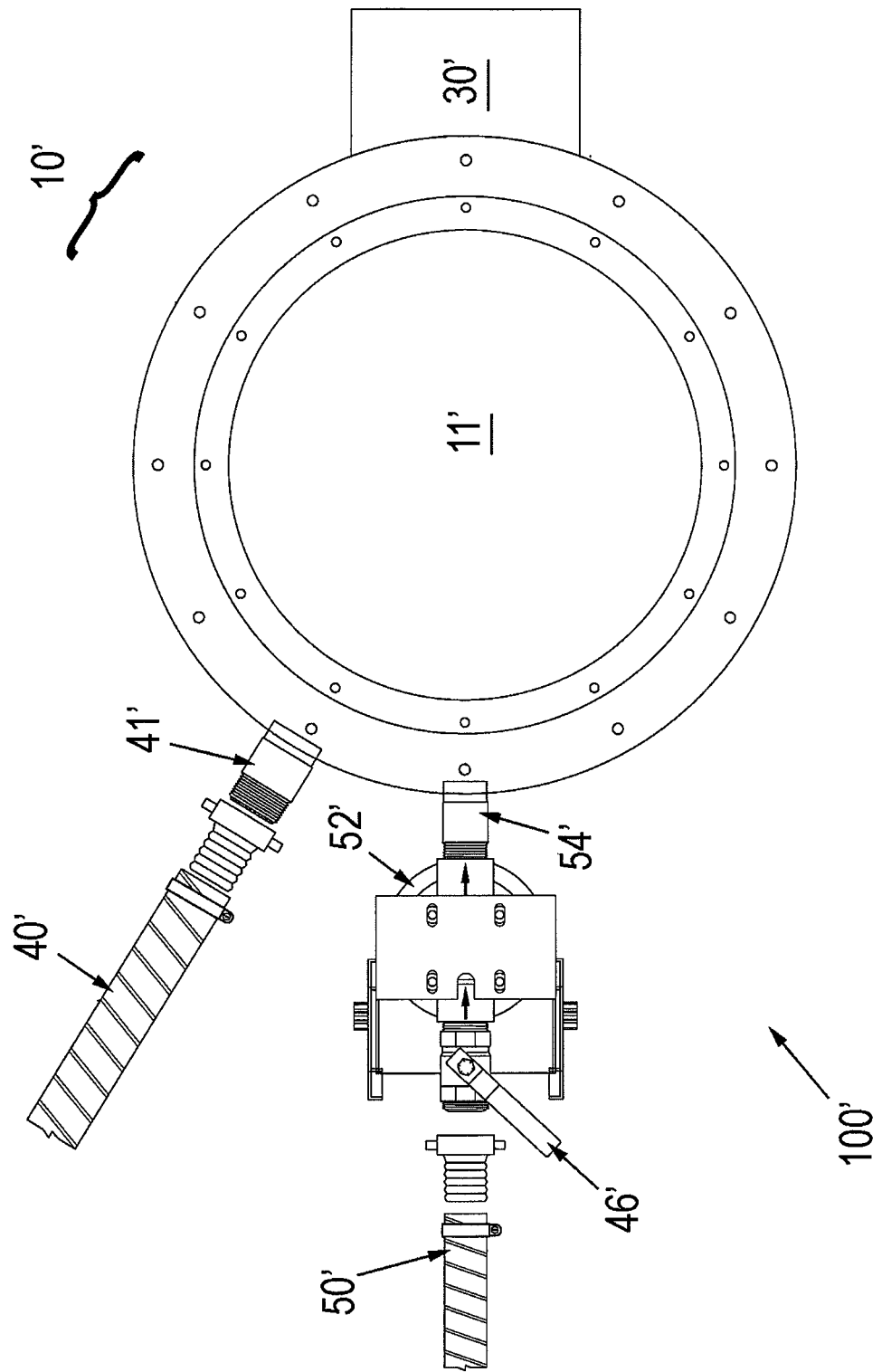
FIG. 12 is a top-down view of the gravity fed sump pump system of FIG. 11.

An alternative embodiment of the sump pump system 100' shown in FIGS. 11-12 is constructed to allow for a gravity fed inflow of fluids. A sump pump barrier 10' includes a housing 12' with an opening 13' therein for receiving a barrier canister 20' and a polishing filter housing 30' (containing the polishing filter cartridge 34 and associated media previously described above), the housing 12' which may be sealed via a cap 11' disposed on the housing 12' top surface. A first conduit 40' connects to a first inlet 41' that leads into the barrier 10'. A second conduit 50' leads into an overflow filter unit 52', which is connected to an overflow pipe 54' disposed through the barrier 10'. A shutoff valve 46' may be disposed on the second conduit 50' to halt further flow of fluid in the event of overflow.

Barrier canister 20' includes flanges 22' extending from its top surface to be received by a mounting bracket 24' extending inwardly from the inside surface of the barrier housing 12'. The barrier canister 20' may be secured within the housing 12' by bolting, welding, clamping, etc., the flanges 22' to the mounting bracket 24'. A pre-filter material 26' is disposed within the housing 12' on top of the canister 20'. A sheen filter 28' is also disposed within the housing 12', on top of the pre-filter material 26'. Disposed within the barrier canister 20' is a hydrocarbon adsorption media capable of absorbing/adsorbing hydrocarbons/sheen present in fluids, while simultaneously allowing water to pass through, as previously mentioned above and identified in U.S. Pat. No. 6,503,390 issued to Gannon on Jan. 7, 2003 titled "FILTRATION OF HYDROCARBON CONTAINING LIQUID".

In at least one embodiment, disposed beneath the canister 20' and within the housing 12' is a false bottom 31', which collects fluids passing through the canister 20' and subsequently drains into a polishing filter conduit 32'. Conduit 32' leads the fluids into a polishing filter housing 30', having the polishing filter cartridge 34 disposed therein. The polishing filter housing 30' traverses through the barrier housing 12', allowing for the final egress of filtered fluid from the sump pump system 100'.

The sump pump system 100' of the present invention is advantageous over prior art pump systems, in that it successfully integrates the features and functions of the sump pump barrier 10 and polishing filter apparatus 30 described above into one barrier housing 12' and allows for fluid flow under gravity forces. In this manner, and as a further unexpected advantage, the construction of such sump pump system 100' allows for the filtration of synthetic ester/sheen from large volumes of water and synthetic ester emulsions, without the necessity of an electric pump to push the fluid through the barrier 10' and into the polishing filter cartridge 34 (unlike the pump 40 and conduit 42 required in the first embodiment disclosed above).

Figure 13:
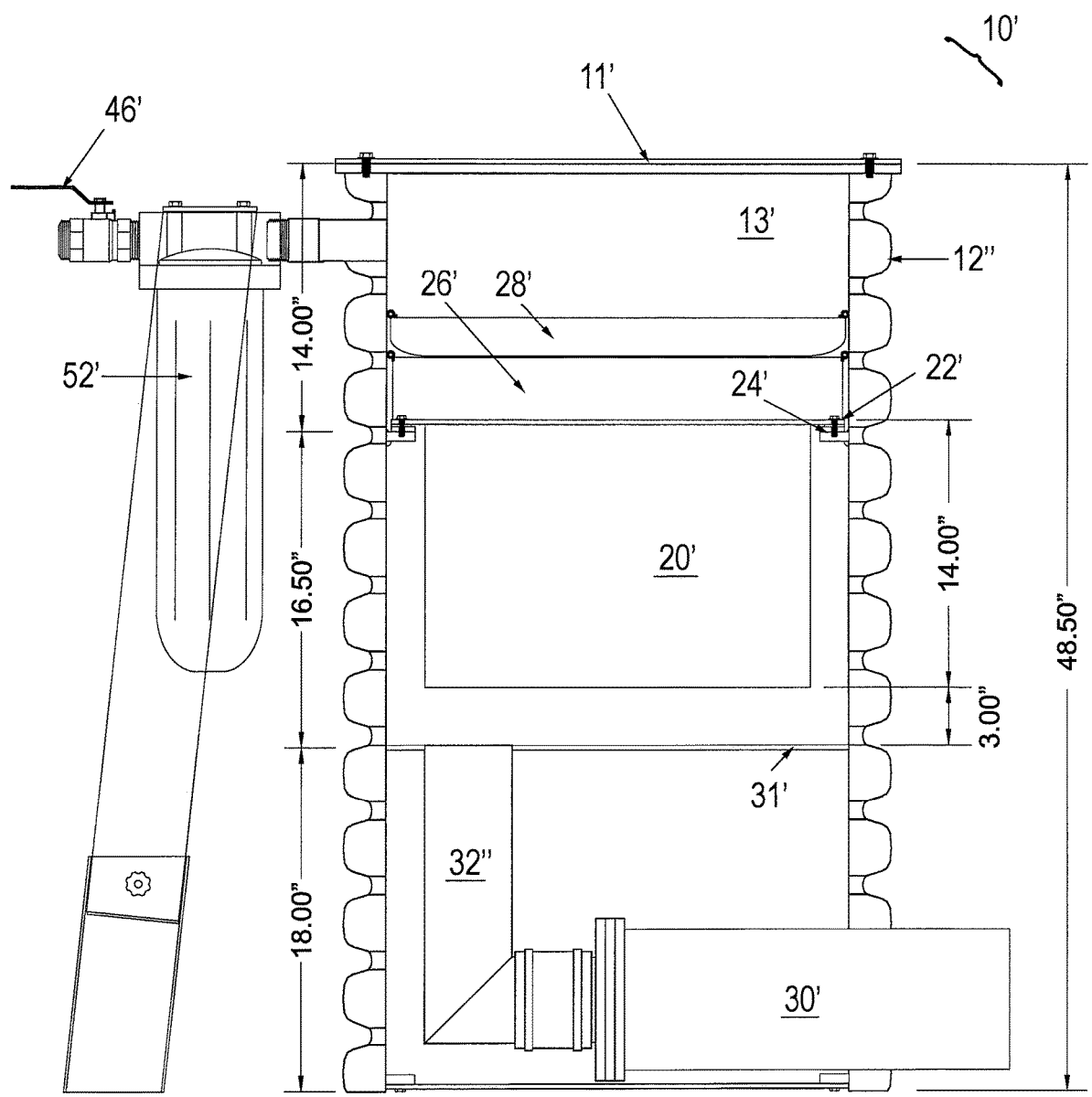
FIG. 13 is a side cross-sectional view of the gravity fed sump pump system of FIG. 11, having different dimensions to accommodate a predetermined head pressure.

The housing 12' of the sump pump system may utilize different dimensions to influence the head pressure exerted on the base of the sump pump barrier 10', which can be used to increase or decrease the flow rate of egressing filtered fluid as desired by the end user. FIG. 13 shows the sump pump system 100' with a different sized barrier housing 12" and a different length polishing filter inlet pipe 32", compared to the embodiment of FIGS. 11 and 12, in which the distance between the canister 20' and the false bottom 31' results in a higher predetermined head pressure for a given volume of water, facilitating gravity initiated flow.

The EPA requires the discharge of water containing oil (including natural ester-based and synthetic ester-based fluids) from power plants to be below 15 parts per million ("ppm"). Many United States territories have more stringent requirements, and Canadian, European, and Australasian regions can have even stricter requirements. FIGS. 7 and 10 depict tabular views of laboratory results using the same test method conducted in FIG. 1 (EPA test method 1664A). The sump pump system 100 of the present invention has proven to be consistently successful in achieving measured values of 5 ppm or less across thirteen (13) separate laboratory tests as shown in FIG. 7, and more recently to maintain consistent measured values of less than 2 ppm as exemplified in the laboratory test data shown in FIG. 10—far below the required threshold of 15 ppm as set by the EPA.

FIGS. 7 and 10 demonstrate that the Pump-Thru-Barrier ("PTB") has been tested with synthetic ester fluid for use as an effective oil containment method. Synthetic ester fluid has the appearance of oil but is a different composition from regular mineral oil and other hydrocarbon oils and fuels. Synthetic ester has become a better alternative for certain electric utility companies due to a much higher flash point relative to a reduced potential of explosions and fire.

The method of the present invention was developed for preventing synthetic ester discharge from containment areas in the event of a large oil spill from a failed transformer or from tanks and equipment filled with synthetic ester. In these applications, products for passive water drainage and absorption/solidification of synthetic ester achieve stoppage of synthetic ester to a point lower than 5 ppm in a water/rain discharge. Even straight (i.e., non-emulsified) synthetic ester oil spills may be stopped in such scenarios. The PTB on its own can stop all flow after the synthetic ester is absorbed in the media as described in the '735 Patent previously referenced herein, but cannot meet the discharge levels required without further treatment, such as the introduction and implementation of a polishing filter of the present invention.

The present invention thus uses the Solidification Products' PTB in environments subject to rain events where a synthetic ester spill could occur, and further utilizes a pump to carry the water/synthetic ester emulsion to the PTB. In these conditions, the emulsion is blended into a milky solution at up to 30 gpm, which then filters through the PTB media canister. The discharge water from this method had been laboratory tested through multiple tests and the measured ppm of synthetic ester in the water was deemed unsatisfactory, as demonstrated in FIG. 1. Samples taken directly from the discharge held ppm levels up to 65 ppm, depending on what stage of testing the samples were taken.

It was determined the polishing filter 32, 32' of the present invention was required to achieve consistently low ppm levels (below 5 ppm). The discharge water from the PTB drains into the polishing filter barrier 20 where the pump 40 is disposed. The pump 40 includes a diaphragm switch, which for example is capable of turning on the pump at a 4"-6" fluid level and shutting off the pump at a 1"-2" fluid level. The water is pumped from within the polishing filter barrier 20 into the polishing filter 32. Here, the water is then restricted to an optimum flow rate, such as 12 gpm, and pumped into the polishing filter. The polishing filter 32 for the new filter cartridge 34 and corresponding media was designed and built to incorporate everything within the polishing filter apparatus, which also contains the pump, conduit system, and preferably a ball valve to pump directly into the polishing filter.

In the gravity fed system 100', fluids are taken directly from a sump containing a synthetic ester/sheen and water/fluid emulsion, and fed into the barrier 10' via the first conduit 40' or second conduit 50'. The synthetic ester emulsion will then pass through the sheen filter 28', pre-filter material 26', and barrier canister 20' under gravitational force. In at least one embodiment, all fluids that pass through the canister 20' will build up on the false bottom 31' and gradually flow into the polishing filter conduit 32', which feeds into the polishing filter housing 30' containing the polishing filter cartridge 34. In creating the gravity fed system 100', it was discovered that significantly higher egressing flow rates (e.g. at least over 5 gallons per minute, and exceeding over 20 gallons per minute) were an unexpected result of pre-wetting under forced pressure the polishing filter cartridge 34 prior to installing the cartridge 34 and polishing filter housing 30' into the sump pump barrier 10'. In the pump embodiment of the sump pump system 100, this pre-wetting step was not required as the filter cartridge 34 is designed to operate under pressures higher than a gravity fed system, which could be achieved via the pump 40. Pre-wetting under forced pressure the cartridge 34 thus led to the discovery that a gravity fed system 100' could operate and achieve high egressing flow rates, similar to those of pressurized pump systems, without the need for the pressurization of the former design. Pre-wetting the cartridge involves flowing water under pressure through the filter media of the cartridge in order to replace a majority of air pockets with liquid.

Additionally, utilizing a gravity fed embodiment mitigates the adverse effect of the sump pump pressure forcing oil through the polishing filter. In a pressurized design, the shockwaves resulting from the pressure pump run the risk of forcing contaminated liquids (inclusive of oil) through the polishing filter, whereas in the gravity fed system embodiment 100', a constant flow rate with minimal pressure (gravity fed pressure) allows for the polishing filter to more consistently capture the contaminants in the fluids without undue pressure detrimental to the filter operation.

It has been determined that the matching of surface energy of the filter media to the surface tension of the fluid being filtered with the current system is such that it is able to force a phase from a highly emulsified oil/water mixture and allow the water to pass while retaining the oil. Throughout this filtration process, the emulsion remains stable due to the relative density and polarity of the synthetic ester oil as compared to water.

Thus, the present invention provides one or more of the following advantages: 1) a sump pump system for the filtration of synthetic ester-based fluid from an emulsion; 2) a method for removing synthetic ester-based fluid from an emulsion; 3) an apparatus for the effective removal of synthetic ester-based fluid from an emulsion; and 4) a new permutation/formulation of media effective against all oils, including mineral, natural, and/or synthetic esters.

While the present invention has been particularly described, in conjunction with one or more specific embodiments, it is evident that many alternatives, modifications and variations will be apparent to those skilled in the art in light of the foregoing description. It is therefore contemplated that the appended claims will embrace any such alternatives, modifications and variations as falling within the true scope and spirit of the present invention.

Thus, having described the invention, what is claimed is:

1. A gravity-fed system for the filtration of synthetic ester-based fluids from an emulsion, comprising:
   a barrier (10') having a sump pump barrier housing (12') with an open top, the housing (12') including:
      an inlet (41') extending through an upper side wall of the housing (12') permitting ingress of fluid to be filtered into the interior of the housing (12');
      a barrier canister (20') containing a hydrocarbon adsorption media capable of absorbing/adsorbing hydrocarbons/sheen present in fluids while simultaneously allowing water to pass therethrough, is disposed within the housing (12');

a false bottom (31') disposed beneath the barrier canister (20') and within the housing (12');

a polishing filter housing (30') having a polishing filter cartridge (34) disposed therein is disposed within the false bottom (31'), the polishing filter cartridge (34) containing a hydrophilic composition capable of removing synthetic ester-based fluids having a surface tension dissimilar to water, the hydrophilic composition having a surface energy greater than or equal to 35 dynes per centimeter;

a polishing filter conduit (32') in fluid communication with an interior volume of the housing (12') beneath the barrier canister (20') and an inlet of the polishing filter housing (30'); and a first conduit (40') for the introduction of a flow of fluid into the sump pump barrier housing is in fluid communication with the inlet (41');

wherein, fluids passing through the barrier canister (20') drain into polishing conduit (32') and flow into and through the polishing filter housing (30'), accomplishing removal of synthetic ester/sheen from volumes of water and synthetic ester emulsions, by gravity, without an electric pump to push the fluid through the barrier (10'), such that filtered fluid exiting the polishing filter housing contains less than 5 ppm of said synthetic ester-based fluids.

2. The system of claim 1 wherein the composition contained within the polishing filter cartridge (34) includes polyether sulfone or a glass fiber media.

3. The system of claim 1 wherein the composition contained within the filter cartridge has a porosity measuring between 0.2-20 μm.

4. The system of claim 1 wherein the composition contained within the filter cartridge is a filter media having a surface energy greater than or equal to 45 dynes per centimeter.

5. The system of claim 1 further including a second conduit for the flow of overflowing fluid egressing from the sump pump barrier housing.

6. The system of claim 1 wherein the polishing filter cartridge is pre-wetted under forced pressure and has an initial flow rate exceeding 5 gallons per minute.

7. The system of claim 1 further including a pre-filter material disposed within the sump pump barrier housing on top of the barrier canister.

8. The system of claim 7 further including a sheen filter disposed within the sump pump barrier housing on top of the pre-filter material.

9. The system of claim 1 further including a cap (11') disposed on a top surface of the housing (12') covering the open top.

* * * * *